United States Patent [19]

Goedecke et al.

[11] 4,369,354
[45] Jan. 18, 1983

[54] ARRANGEMENT FOR MONITORING THE OPERATION OF A HEATING ELEMENT

[75] Inventors: Ludger Goedecke, Munich; Hans von Hayek, Neuried, both of Fed. Rep. of Germany

[73] Assignee: Siemens Aktiengesellschaft, Berlin & Munich, Fed. Rep. of Germany

[21] Appl. No.: 196,532

[22] Filed: Oct. 14, 1980

[30] Foreign Application Priority Data

Nov. 6, 1979 [DE] Fed. Rep. of Germany ....... 2944796

[51] Int. Cl.$^3$ ............................................. H05B 1/02
[52] U.S. Cl. ................................... 219/506; 219/483; 219/502; 219/216; 219/492; 219/505; 219/509; 307/117; 307/252 B; 361/106
[58] Field of Search ............... 219/490, 502, 492, 483, 219/493, 486, 497, 501, 505, 506, 504, 216, 507, 509; 361/103, 100, 106; 307/117, 310, 252 B

[56] References Cited

U.S. PATENT DOCUMENTS

| | | | |
|---|---|---|---|
| 4,001,650 | 1/1977 | Romain | 361/106 |
| 4,039,928 | 8/1977 | Noftsker et al. | 361/103 |
| 4,104,692 | 8/1978 | Sudo et al. | 361/106 |
| 4,109,134 | 8/1978 | Van Herten | 219/497 |
| 4,233,498 | 11/1980 | Payne et al. | 219/492 |

Primary Examiner—B. A. Reynolds
Assistant Examiner—M. Paschall
Attorney, Agent, or Firm—Hill, Van Santen, Steadman, Chiara & Simpson

[57] ABSTRACT

A heating arrangement in a fixing station of a printing device has its operation monitored by an arrangement in which a measuring element is disposed in series with the heating element and a switch element. The measuring element is traversed by the heating current and emits a corresponding voltage which is supplied to an amplifier circuit which produces pulse-shaped clock signals as long as the heating current flows through the measuring element and the heating element. The clock signals are supplied to a reset input of a flip-flop whose dynamic input is connected to an oscillator operating at a frequency lower than that of the alternating current so that as long as clock pulses occur, the flip-flop is constantly reset. Therefore, the flip-flop can only be set over a longer interval when no heating current is flowing. If heating current flows although no heating current should flow, the same is identified by a counter whose counting input is connected to the amplifier circuit and whose reset input is connected to a heat sensor. Therefore, an undesired heating current through the heating element causes operation of the counter. A set flip-flop or a counting counter indicate malfunctions of the heating arrangement.

27 Claims, 2 Drawing Figures

ARRANGEMENT FOR MONITORING THE OPERATION OF A HEATING ELEMENT

BACKGROUND OF THE INVENTION

1. Field of the Invention

The present invention relates to an arrangement for monitoring the operation of a heating element containing a series connection of a switch and at least one heating element in which the heating element is traversed by an alternating current of a first frequency in the conducting state of the switch, particularly for monitoring the heating element arranged in the fixing station of an electrostatic printer or copying device.

2. Description of the Prior Art

The monitoring of heating arrangements which contain a heating element, for example a radiant heater, is required, for example, in non-mechanical printing devices or, respectively, copying devices. Heating elements, for example radiant heaters, are employed in such devices in a fixing station in which toner images apply to a paper web are fused into the paper. The heating elements can be arranged within fixing drums or fixing saddles. In order to achieve faultless fixing of the toner images on the paper web, it is necessary to terminate the fixing when a malfunction occurs in the heating arrangement. An arrangement for monitoring the heating arrangement is therefore required.

SUMMARY OF THE INVENTION

The object of the present invention, therefore, is to provide an arrangement for monitoring the operation of a heating element.

The object of the present invention, therefore, is to provide an arrangement for monitoring the operation of a heating element.

Given an arrangement of the type initially mentioned, the above object is achieved in that a measuring element is arranged in the heating arrangement; in that an amplifier circuit for identifying the voltage across the measuring element is connected in parallel with the measuring element, the amplifier emitting a pulse-shaped clock signal when the voltage at the measuring element exceeds a threshold value; in that a flip-flop is provided and has its reset input connected to the amplifier; and in that an oscillator is provided which oscillates as a second frequency which is smaller in comparison to the first frequency of the voltage across the measuring element, the oscillator being connected to the dynamic input of the flip-flop.

Given an arrangement of the type initially mentioned, the above object is further achieved in that a measuring element is arranged in the heating arrangement; in that an amplifier for identifying the voltage across the measuring element is connected in parallel with the measuring element and emits pulse-shaped clock signals when the voltage across the measuring element exceeds a threshold value; and in that a counter is provided and has its counting input connected to the output of the amplifier and a reset input connected to a sensor which determines the termperature of the heating element and emits a sensor signal when the heating element lies below the desired temperature.

It is possible to identify the fault-free operation of the heating element by employing the flip-flop and the oscillator. When, in particular, no current flows through the heating element, although the heating element should be in operation, no clock signals are generated and, therefore, the flip-flop is no longer reset. Therefore, the flip-flop remains in the set state due to the signals from the oscillator. It is advantageous for sampling the output signal of the flip-flop by providing an AND circuit having one input connected to the flip-flop and another input connected to the oscillator by way of an inverter. With this structure, it is achieved in a simple manner that the output signal of the flip-flop is identified upon the occurrence of the trailing edge of the oscillator signal.

The monitoring of the heating element should only occur when it is intended that current be flowing through the heating element. For this reason, it is advantageous to block the flip-flop when the heating element is not to be actuated. A sensor can be employed for this purpose, the sensor determining the temperature of the heating element and emitting a sensor signal when the temperature of the heating element has not yet reached the desired value. The output of the sensor is connected to the reset input of the flip-flop by way of an inverter circuit. If, therefore, no sensor signal occurs, then a reset signal is applied to the flip-flop so that the flip-flop is blocked.

The counter can be employed for monitoring the switching element which, for example, can comprise a triac. If, in particular, the switching element, for example a triac, has its operation disrupted, there then exists the danger that current will constantly flow through the heating element. Clock signals are also constantly generated by the amplifier circuit in such a case, the signals being supplied to the counting input of the counter. If the sensor no longer emits a sensor signal, if, therefore, the heating element is no longer to be operated, then the counter is no longer reset. The result is that the counter can continue to count. When the counter has reached a specific counter reading, this is an indication that the switch element is no longer working properly. It is advantageous for evaluating the counter reading and therefore, for identifying the malfunction, to provide a second flip-flop which is connected via an AND circuit to two outputs of the counter. Therefore, the AND circuit can emit a signal when the counter has counted, for example, three clock signals and can therefore set the second flip-flop.

A line segment between the switch element and the heating element can be employed, for example, as the measuring element. In a simple manner, the amplifier circuit can then comprise a transformer connected parallel to the line segment, an operational amplifier connected to the secondary winding of the transformer, and a Schmitt trigger connected to the output of the operational amplifier. The Schmitt trigger emits a pulse-shaped clock signals.

If two heating elements must be connected in series, the heating elements can be employed as the measuring elements. The voltage across each heating element is identified with the assistance of a respective amplifier circuit which comprises an opto-coupler arranged parallel to the heating element and a Schmitt trigger connected to the output of the opto-coupler for generating the clock signals.

In order to indicate faultless function of the heating arrangement, a light emitting diode (LED) which is illuminated as long as a heating current flows, can be arranged in a simple manner at the output of the Schmitt trigger.

BRIEF DESCRIPTION OF THE DRAWINGS

Other objects, features and advantages of the invention, its organization, construction and modes of operation will be best understood from the following detailed description, taken in conjunction with the accompanying drawings, on which.

DESCRIPTION OF THE PREFERRED EMBODIMENTS

Figure 1:
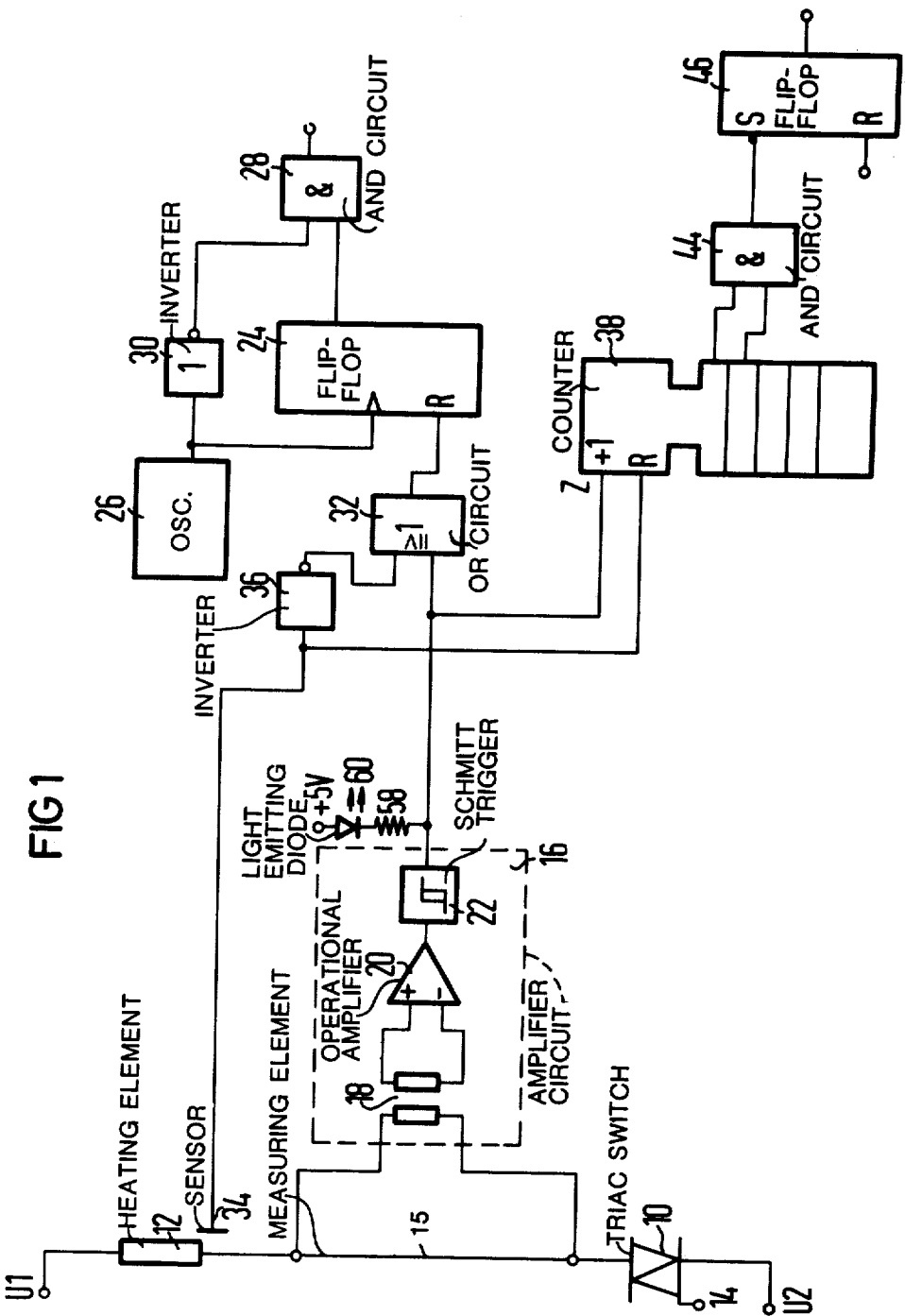
FIG. 1 is a schematic diagram of a first embodiment of the invention for an arrangement for monitoring a heating arrangement.

Referring to FIG. 1, a heating arrangement comprises a switch element 10, for example a triac, and a heating element 12, for example a radiant heater, connected in series. The series circuit of the switch element 10 and the heating element 12 is connected between two operating potentials U1 and U2 of, for example, an alternating voltage of 50 Hz. When a signal is applied to a control input 14 of a switch element 10, the switch element 10 is rendered conductive and, therefore, an alternating current flows through the switch element 10 and the heating element 12. The heating element 12 is thus energized.

For monitoring the operation of the heating element 12, a measuring element 15 is connected in the series circuit of the switch element 10 and the heating element 12, the measuring element 14 here comprising a line segment. When a current flows through the series circuit, a voltage drop of approximately 50 mVolt occurs across the line segment 15. The voltage drop across the line segment 15 is identified with the assistance of an amplifier circuit 16.

The amplifier circuit 16 comprises a transformer 18 having a primary winding connected across the line segment 15 and a secondary winding which is connected to both inputs of an operational amplifier 20. The operational amplifier 20 is, in turn, connected to the input of a Schmitt trigger 22. With this structure, the Schmitt trigger 22 is operated to emit pulse-shaped clock signals at its output when the voltage drop across the line segment 15 exceeds a specific threshold value. The clock signal, therefore, always occurs at the frequency of the alternating current traversing the line segment 15. The clock signal can be derived from the negative half wave or the positive half wave of the alternating current.

The clock signals at the output of the amplifier 16, therefore, only occur when an alternating current flows in the series circuit of the switch element 10, the line segment 15 and the heating element 12. The clock signals are supplied to a flip-flop 24, in particular to its reset input R. An oscillator 26 is connected to the dynamic input of the flip-flop 24, the oscillator generating oscillator signals whose frequency is lower than the frequency of the alternating current. The flip-flop 24, therefore, is always set when an oscillator signals occurs at the output of the oscillator 26. However, it is always reset when a clock signal is emitted at the output of the amplifier circuit 16. Since the frequency of the clock signals is higher than the frequency of the oscillator signals, the flip-flop 24 is always reset as long as an alternating current flows through the series connection of the switch element 10, the line segment 15 and the heating element 12. If, in contrast thereto, alternating current does not flow in the series circuit, the flip-flop 24 remains set.

The output of the flip-flop 24 is sampled with the assistance of an AND circuit 28. To this end, the AND circuit 28 is connected with one of its inputs by way of an inverter 30 to the oscillator 26. This provides that, with the assistance of the AND circuit 28 and after the occurrence of the trailing edge of the oscillator signal, it is determined whether the flip-flop is set. If this is true, then a malfunction in the heating element 12 exists and the AND gate provides a corresponding signal, i.e. an alternating current should be flowing through the series connection, but is not.

Since the monitoring circuit for the heating element 12 is only meant to be switched on during the time in which the current must flow through the heating element 12, a sensor signal is supplied to the reset input R of the flip-flop 24 from a sensor 34 by way of an inverter 36 and an OR circuit 32. The sensor 34 can comprise a negative temperature coefficient (NTC) resistor which is arranged in the proximity of the heating element 12 and whose resistance depends on the temperature of the heating element. As long as the temperature of the heating element has not exceeded a specific value, the sensor 34 emits the sensor signal and thus indicates that an alternating current should flow through the heating element 12. Thereby, the sensor signal can be a binary "1". The sensor signal is inverted in the inverter element 36 and is applied to the reset input R of the flip-flop 24 by way of the OR circuit 32. Due to the inversion, the "1" becomes a "0" and, therefore, the flip-flop 24 is not influenced by the sensor 34. If, to the contrary, no heating is to be undertaken, i.e. no current should flow through the heating element 12, then the sensor signal is a binary "0". This signal is inverted by the inverter element 36 into a binary "1" and thus resets the flip-flop 24. Therefore, as long as the sensor signal is a binary "0", the flip-flop 24 cannot be set by the oscillator 26. With such a control, the monitoring circuit for the heating element 12 is switched off when no current is meant to flow through the heating element 12.

Up to this point, that portion of the arrangement has been described which is required for monitoring the heating element 12. The heating arrangement, however, also comprises the switch element 10 which must likewise be monitored with respect to its operation. If the switch element 10 no longer operates faultlessly, if, therefore, it allows current to pass even though the current should be blocked, then a current will also flow through the heating element 12 when there is no intent to heat. In order to be able to identify this malfunction, a counter 38 is provided. The output of the amplifier circuit 16 is connected to the counting input Z of the counter 38. The reset input R of the counter 38 is connected to the sensor 34.

As long as alternating current flows through the heating element 12, clock signals are generated at the output of the amplifier circuit 16 and are supplied to the counter 38. When, further, the sensor 34 emits a binary "1" signal and, therefore, indicates that the heating element 12 should be heated, this signal is applied to the reset input R of the counter 38 and constantly resets the counter. In this error-free state, therefore, the counter 38 cannot count. If, in contrast thereto, a current flows through the heating element 12 although the heating element 12 has already exceeded the desired temperature, then the sensor 34 emits a binary "0" signal. The binary "0" signal is, in turn, supplied to the reset input R of the counter 38 and, therefore, the counter 38 is no longer reset. Since clock signals arrive from the amplifier circuit 16 at the same time, the counter 38 is exercised to count up. A malfunction of the switch element 5 is thus indicated.

An AND circuit 44 can be connected to the outputs of the counter stages in order to sample the error reading. By an appropriate connection of the counter stages to the AND circuit 44, it can be achieved that the AND circuit emits a signal when the counter 38 has reached a predetermined counter reading. The signal from the AND circuit 44 can be supplied to a further flip-flop 46 at its set input S. The switch element 10 always operates faultlessly when the flip-flop 46 is set.

Figure 2:
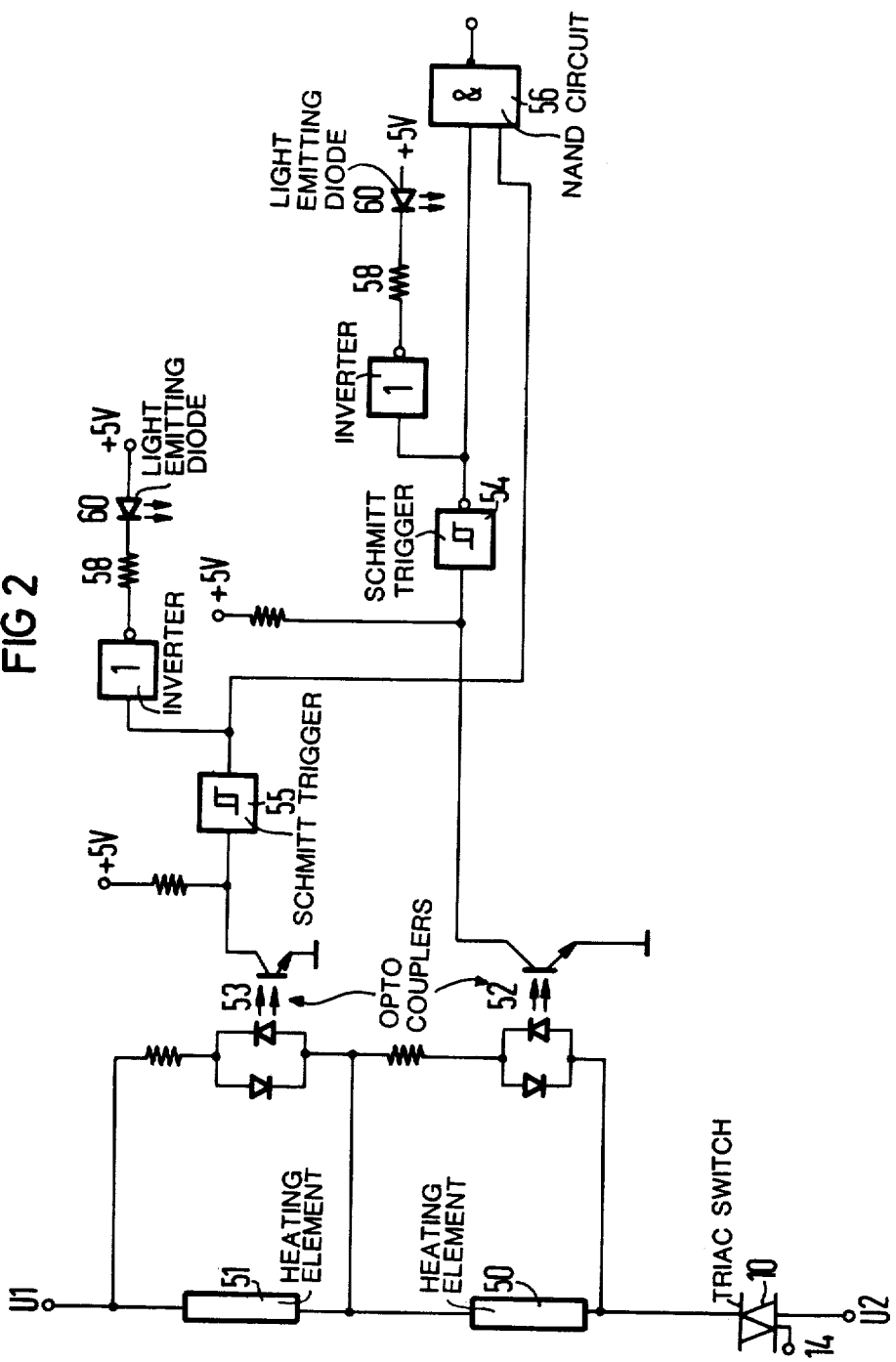
FIG. 2 is a schematic diagram of a second embodiment of the invention for an arrangement for monitoring a heating arrangement.

In FIG. 1, a line segment 15 has been employed as the measuring element. Referring to FIG. 2, a heating element itself is employed as the measuring element. This is advantageous when two heating elements must be connected in series. When the switch element 10 is rendered conductive, the series connection of the heating elements 50, 51 is connected between the alternating voltage U1, U2. As long as the heating elements 50, 51 operate faultlessly, the voltage across each heating element 50, 51 corresponds to half the alternating voltage. If, on the other hand, a heating element 50, 51 is defective, then the entire alternating voltage lies across this heating element. The voltage at the other heating element, therefore, has a small value.

The voltage across the heating elements 50, 51 is supplied to a respective opto-coupler 52, 53 which respond as long as the voltage across the assigned heating element 50, 51 does not assume the small value. The output of the opto-couplers 52, 53 is connected to a respective Schmitt trigger 54, 55 which emit clock signals which are supplied by way of a NAND circuit 56 to the flip-flop 24 or, respectively, to the counter 38 of FIG. 1. According to FIG. 2, therefore, the amplifier circuit comprises the opto-coupler 52 or, the opto-coupler 53 and the respective Schmitt trigger 54 or 55, and the NAND circuit 56. The further evaluation occurs in the manner described with respect to FIG. 1.

A display circuit comprising a resistor 58 and a LED 60 can be arranged at the output of the Schmitt triggers 52, 53, 54, 55. The LED 60 is illuminated as long as clock pulses are emitted, i.e. as long as a heating current flows.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. An arrangement for monitoring the operation of a heating circuit which is connected to a pair of terminals of an alternating voltage source operating at a first frequency and which includes a switch and at least one heating element connected in series between the terminals, said arrangement comprising:
   a switch;
   at least one heating element connected in series with said switch;
   an alternating voltage source operating at a first frequency and connected across the series connection of said switch and said heating element;
   a measuring element connected in series with said switch and said heating element;
   an amplifier circuit connected across said measuring element and operable to produce clock pulses in response to a predetermined voltage drop across said measuring element;
   an oscillator producing an oscillator signal at a second frequency which is lower than the first frequency;
   a flip-flop including an output, a dynamic input connected to said oscillator, and a reset input connected to said amplifier circuit and operable to produce a fault signal at its output in response to said oscillator signal and the loss of said clock pulses;
   an OR circuit including a first input connected to said amplifier circuit, a second input and an output connected to said reset input of said flip-flop;
   a sensor for sensing the heated state of said heating element and producing a corresponding signal; and
   an inverter connected to said sensor for inverting its signal, and connected between said second input of said OR circuit and said sensor for resetting said flip-flop in response to said corresponding signal.

2. An arrangement for monitoring the operation of a heating circuit which is connected to a pair of terminals of an alternating voltage source operating at a first frequency and which includes a switch and at least one heating element connected in series between the terminals, said arrangement comprising:
   a switch;
   at least one heating element connected in series with said switch;
   an alternating voltage source operating at a first frequency and connected across the series connection of said switch and said heating element;
   a measuring element connected in series with said switch and said heating element;
   an amplifier circuit connected across said measuring element and operable to produce clock pulses in response to a predetermined voltage drop across said measuring element;
   an oscillator producing an oscillator signal at a second frequency which is lower than the first frequency;
   a flip-flop including an output, a dynamic input connected to said oscillator, and a reset input connected to said amplifier circuit and operable to produce a fault signal at its output in response to said oscillator signal and the loss of said clock pulses;
   an inverter connected to said oscillator; and
   an AND circuit connected to said inverter and to said output of said flip-flop and operable to open in response to the inverted oscillator oscillations and the fault signal.

3. The arrangement of claim 2, wherein:
said measuring element comprises a heating element.

4. The arrangement of claim 2, wherein:
said measuring element comprises a wire segment connected between said switch and said heating element.

5. The arrangement of claim 1, wherein:
said measuring element comprises a heating element.

6. The arrangement of claim 1, wherein:

said measuring element comprises a wire segment connected between the switch and the heating element.

7. An arrangement for monitoring the operation of a heating circuit which is connected to a pair of terminals of an alternating voltage source operating at a first frequency and which includes a switch and at least one heating element connected in series between the terminals, said arrangement comprising:
- a switch;
- at least one heating element connected in series with said switch;
- an alternating voltage source operating at a first frequency and connected across the series connection of said switch and said heating element;
- a measuring element connected in series with said switch and said heating element;
- an amplifier circuit connected across said measuring element and operable to produce clock pulses in response to a predetermined voltage drop across said measuring element;
- an oscillator producing an oscillator signal at a second frequency which is lower than the first frequency;
- a flip-flop including an output, a dynamic input connected to said oscillator, and a reset input connected to said amplifier circuit and operable to produce a fault signal and its output in response to said oscillator signal and the loss of said clock pulses;
- a transformer including a primary winding connected to said measuring element, and a secondary winding;
- an operational amplifier connected to said secondary winding; and
- a trigger circuit connected to said operational amplifier and operable to produce the clock pulses.

8. The arrangement of claim 7, and further comprising:
- an indicator circuit connected to and operated by said trigger circuit;

9. The arrangement of claim 8, wherein:
said indicator circuit comprises a light-emitting diode.

10. The arrangement of claim 7, wherein said operational amplifier is connected across said secondary winding, and said primary winding is connected across the measuring element.

11. An arrangement for monitoring the operation of a heating circuit which is connected to a pair of terminals of an alternating voltage source operating at a first frequency and which includes a switch and at least one heating element connected in series between the terminals, said arrangement comprising:
- a switch;
- at least one heating element connected in series with said switch;
- an alternating voltage source operating at a first frequency;
- a measuring element connected in series with said switch and said heating element, the series connection of said switch, heating element and measuring element connected across said alternating current voltage source;
- an amplifier circuit connected across said measuring element and operable to produce clock pulse in response to a predetermined voltage drop across said measuring element;
- a counter including a reset input and a counting input connected to said amplifier to receive the clock pulses; and
- a temperature sensor adjacent said heating element and connected to said reset input operable to emit a sensor signal when said heating element is below a predetermined desired temperature.

12. The arrangement of claim 11, wherein said counter includes a plurality of stages, and further comprising:
- a flip-flop including a set input and an output; and
- an AND circuit including inputs connected to respective counter stages and an output connected to said set input.

13. The arrangement of claim 11, wherein:
said measuring element comprises a wire segment connected between the switch and the heating element.

14. The arrangement of claim 11, wherein:
said measuring element comprises a heating element.

15. The arrangement of claim 11, wherein:
said amplifier circuit comprises an opto-coupler connected to said measuring element and a trigger circuit connected to said opto-coupler.

16. The arrangement of claim 15, and further comprising:
- a light-emitting diode connected to said trigger circuit.

17. An arrangement for monitoring the operation of a heating circuit which is connected to a pair of terminals of an alternating voltage source operating at a first frequency and which includes a switch and at least one heating element connected in series between the terminals, said arrangement comprising:
- a heating element;
- a switch connected in series with said heating element;
- an alternating voltage source operating at a first frequency and including a pair of terminals connected across the series combination of said heating element and said switch;
- a measuring element connected in series with said switch and said heating element;
- an amplifier circuit connected across said measuring element and operable to produce clock pulses in response to a predetermined voltage drop across said measuring element;
- an oscillator producing an oscillator signal at a second frequency which is lower than said first frequency;
- a flip-flop including an output, a dynamic input connected to said oscillator, and a reset input connected to said amplifier circuit and operable to produce a fault signal at its output in response to said oscillator signal and the loss of said clock pulses;
- a counter including a reset input and a counting input connected to said amplifier circuit to receive the clock pulses; and
- a temperature sensor adjacent said heating element and connected to said reset input and operable to emit a sensor signal when said heating element is below a predetermined desired temperature.

18. The arrangement of claim 17, and further comprising:
- an OR circuit including a first input connected to said amplifier circuit, a second input and an output connected to said reset input of said flip-flop; and an inverter connected to said sensor for inverting its signal, and connected between said second input of said OR gate and said sensor for resetting said flip-flop in response to said corresponding signal.

19. The arrangement of claim 17, and further comprising:
an inverter connected to said oscillator; and
an AND circuit connected to said inverter and to said output of said flip-flop and operable to open in response to the inverted oscillator oscillations and the fault signal.

20. The arrangement of claim 17 wherein:
said measuring element comprises a heating element.

21. The arrangement of claim 17, wherein:
said measuring element comprises a wire segment connected between the switch and the heating element.

22. The arrangement of claim 17, wherein said amplifier circuit comprises:
a transformer including a primary winding connected to said measuring element, and a secondary winding;
an operational amplifier connected to said secondary winding; and
a trigger circuit connected to said operational amplifier and operable to produce the clock pulses.

23. The arrangement of claim 22, and further comprising:
an indicator circuit connected to and operated by said trigger circuit.

24. The arrangement of claim 23, wherein:
said indicator circuit comprises a light-emitting diode.

25. The arrangement of claim 22, wherein said operational amplifier is connected across said secondary winding, and said primary winding is connected across said measuring element.

26. The arrangement of claim 17, wherein said counter includes a plurality of stages, and further comprising:
a further flip-flop including a set input and an output; and
an AND circuit including inputs connected to respective counter stages and an output connected to said set input.

27. The arrangement of claim 17, wherein:
said amplifier circuit comprises a trigger circuit operable to produce clock pulses in response to a predetermined voltage drop across said measuring element; and further comprising
a light-emitting diode connected to and operated by said trigger circuit.

* * * * *